US012610315B2

(12) United States Patent
Yang

(10) Patent No.: US 12,610,315 B2
(45) Date of Patent: Apr. 21, 2026

(54) DATA TRANSMISSION PROCESSING METHOD, APPARATUS, USER EQUIPMENT AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 516 days.

(21) Appl. No.: 18/000,349

(22) PCT Filed: Jun. 3, 2020

(86) PCT No.: PCT/CN2020/094139
§ 371 (c)(1),
(2) Date: Nov. 30, 2022

(87) PCT Pub. No.: WO2021/243600
PCT Pub. Date: Dec. 9, 2021

(65) Prior Publication Data
US 2023/0232327 A1      Jul. 20, 2023

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
CPC . H04W 52/0229; H04W 76/28; H04W 92/18; H04W 52/0216; H04W 52/0219; H04W 52/0235; H04W 52/0248; H04W 76/23; Y02D 30/70
See application file for complete search history.

(56) References Cited

U.S. PATENT DOCUMENTS

| | | | |
|---|---|---|---|
| 9,119,097 B2 | 8/2015 | Chatterjee et al. | |
| 9,125,091 B2 | 9/2015 | Heo et al. | |
| 9,325,485 B2 | 4/2016 | Li et al. | |
| 9,794,873 B2 | 10/2017 | Lindoff et al. | |
| 10,091,818 B2 | 10/2018 | Li et al. | |
| 10,462,740 B2 | 10/2019 | Yang et al. | |
| 2013/0272132 A1 | 10/2013 | Heo et al. | |

(Continued)

FOREIGN PATENT DOCUMENTS

| | | |
|---|---|---|
| CN | 104272850 A | 1/2015 |
| CN | 107113727 A | 8/2017 |

(Continued)

OTHER PUBLICATIONS

3GPP TSG-RAN2 Meeting#107bis ; R2-1913787; Source: Huawei, HiSilicon; Title: Further discussion on the impact of PDCCH-WUS; ChongQing, China, Oct. 14-18, 2019. (Year: 2019).*

(Continued)

*Primary Examiner* — Mohammed S Chowdhury
(74) *Attorney, Agent, or Firm* — Oblon, McClelland, Maier & Neustadt, L.L.P.

(57) ABSTRACT
A data transmission processing method can include sending a sidelink (SL) control signaling that carries a wake-up signal configuration to a second UE, where the wake-up signal configuration is associated with transmitting an SL wake-up signal from the first UE to the second UE.

15 Claims, 8 Drawing Sheets

```
┌──────────┐                              ┌───────────┐
│ First UE │                              │ Second UE │
└────┬─────┘                              └─────┬─────┘
     │                                          │
     │  S201, send an SL control signaling to a │
     │  second UE, where the SL control         │
     │  signaling carries a wake-up signal      │
     │  configuration and the wake-up signal    │
     │  configuration is associated with        │
     │  transmitting an SL wake-up signal from  │
     │  the first UE to the second UE           │
     │─────────────────────────────────────────▶│
     │                                          │
┌────┴──────────────────────┐                   │
│ S204, determine a priority│                   │
│ of the SL wake-up signal  │                   │
│ transmitted to the        │                   │
│ second UE                 │                   │
└────┬──────────────────────┘                   │
     │                                          │
┌────┴──────────────────────────────────┐       │
│ S205, determine, based on the         │       │
│ transmission configuration and the    │       │
│ priority of the SL wake-up signal,    │       │
│ to transmit the SL wake-up signal to  │       │
│ the second UE or not to transmit the  │       │
│ SL wake-up signal to the second UE    │       │
└────┬──────────────────────────────────┘       │
     │─────────────────────────────────────────▶│
     │                                          │
```

(56) References Cited

U.S. PATENT DOCUMENTS

| | | | |
|---|---|---|---|
| 2013/0272148 A1 | 10/2013 | Fong et al. | |
| 2013/0272170 A1 | 10/2013 | Chatterjee et al. | |
| 2013/0272182 A1 | 10/2013 | Li et al. | |
| 2013/0272214 A1 | 10/2013 | Zhu et al. | |
| 2013/0272215 A1 | 10/2013 | Khoryaev et al. | |
| 2013/0273878 A1 | 10/2013 | Heo et al. | |
| 2016/0142974 A1 | 5/2016 | Lindoff et al. | |
| 2016/0381708 A1 | 12/2016 | Li et al. | |
| 2018/0041959 A1 | 2/2018 | Yang et al. | |
| 2018/0167974 A1 | 6/2018 | Li et al. | |
| 2020/0029386 A1 | 1/2020 | Nam et al. | |
| 2020/0037247 A1 | 1/2020 | Liao et al. | |
| 2022/0264462 A1* | 8/2022 | Bao | H04W 52/0274 |
| 2022/0264696 A1* | 8/2022 | Bao | H04W 52/0219 |
| 2022/0303904 A1* | 9/2022 | Tsai | H04W 52/0206 |
| 2022/0353815 A1* | 11/2022 | Lin | H04W 52/0232 |
| 2023/0018928 A1* | 1/2023 | Luo | H04W 52/0219 |
| 2023/0247554 A1* | 8/2023 | Yoshioka | H04W 92/18 |
| | | | 370/318 |

FOREIGN PATENT DOCUMENTS

| | | | |
|---|---|---|---|
| CN | 108377535 A | 8/2018 | |
| CN | 109219116 A | 1/2019 | |
| CN | 109479244 A | 3/2019 | |
| CN | 109952789 A | 6/2019 | |
| CN | 110199550 A | 9/2019 | |
| CN | 110536386 A | 12/2019 | |
| EP | 3 522 612 A1 | 8/2019 | |
| EP | 3 522 612 B1 | 7/2020 | |

OTHER PUBLICATIONS

62909965-SPEC_Oct. 3, 2019 => U.S. Appl. No. 62/909,965 provisional for 20220303904 <TSAI>; filed on Oct. 9, 2019. See p. 4 along with Fig. 1 (Year: 2019).*

Xie Xiao-Min, et al., "A QoS Routing Protocol for Cognitive Networks," Chinese Journal of Computers, vol. 36, No. 9, Sep. 2013, pp. 1807-1815 (with English Abstract).

International Search Report issued Mar. 1, 2021 in PCT/CN2020/094139, filed on Jun. 3, 2020, 6 pages (with English Translation).

English translation of Written Opinion issued Mar. 1, 2021 in PCT/CN2020/094139, 4 pages.

Combined Chinese Office Action and Search Report issued Nov. 29, 2022 in Patent Application No. 202080001167.3 (with English language translation and English translation of Category of Cited Documents), 12 pages.

Huawei, HiSilicon, "Introduction of further NB-IoT enhancements other than EDT in TS 36.331," 3GPP TSG-RAN2 Meeting #102, R2-1807878, May 2018, 41 pages.

* cited by examiner

| First UE | | Second UE |
| --- | --- | --- |

S201, send an SL control signaling to a second UE, where the SL control signaling carries a wake-up signal configuration and the wake-up signal configuration is associated with transmitting an SL wake-up signal from the first UE to the second UE

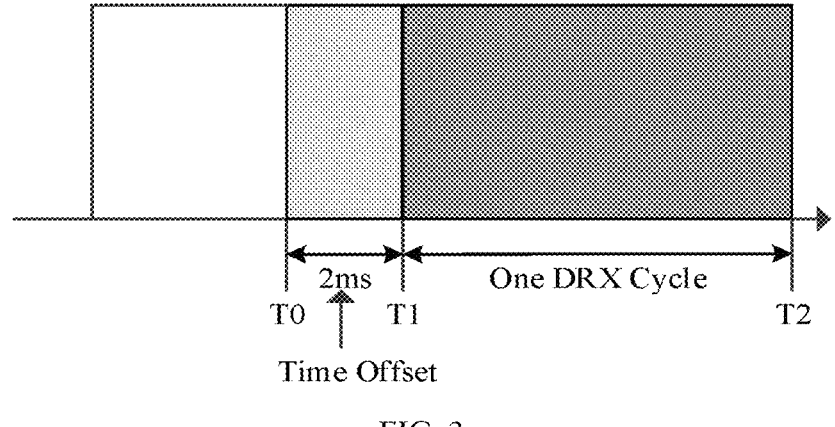

2ms

One DRX Cycle

T0          T1                          T2

Time Offset

FIG. 3

| First UE | | Second UE |
|---|---|---|

S201, send an SL control signaling to a second UE,
where the SL control signaling carries a wake-up signal
configuration and the wake-up signal configuration is
associated with transmitting an SL wake-up signal from
the first UE to the second UE S202, transmit the first type of SL wake-up signal to the
second UE at the transmission starting time in response
to being unable to transmit all to-be-transmitted SL data
to the second UE in a current DRX cycle

FIG. 4

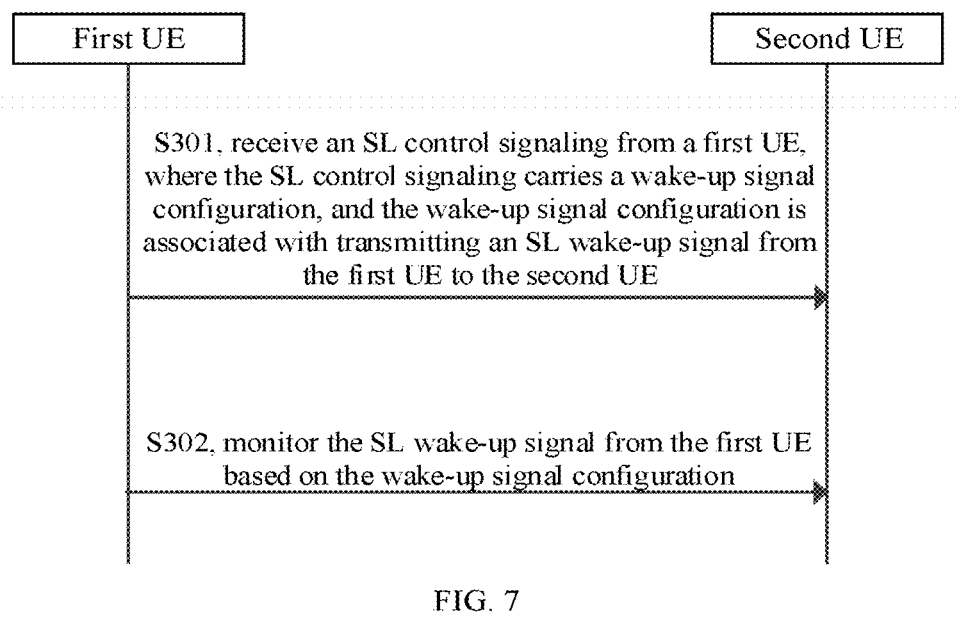

```
┌─────────────────┐                              ┌─────────────────┐
│    First UE      │                              │   Second UE     │
└─────────────────┘                              └─────────────────┘
```

S301, receive an SL control signaling from a first UE, where the SL control signaling carries a wake-up signal configuration, and the wake-up signal configuration is associated with transmitting an SL wake-up signal from the first UE to the second UE S302, monitor the SL wake-up signal from the first UE based on the wake-up signal configuration

FIG. 7

DATA TRANSMISSION PROCESSING METHOD, APPARATUS, USER EQUIPMENT AND STORAGE MEDIUM

CROSS-REFEENCE TO RELATED APPLICATION

This application is the U.S. national phase application of International Application No. PCT/CN2020/094139, filed on Jun. 3, 2020, the disclosure of which is incorporated herein by reference in its entirety for all purposes.

BACKGROUND OF THE INVENTION

Field of the Invention

The present disclosure relates to but is not limited to the field of wireless communication, and in particular, relates to a data transmission processing method, apparatus, user equipment, and storage medium.

Description of the Related Art

In related arts, a means of communication, sidelink (SL), is introduced to support communications between a user equipment (UE) and another UE. According to corresponding relationships between a UE at a transmitting side and one or more UEs at a receiving side, three transmission modes are supported on the SL: unicast, multicast, and broadcast.

For a Uu, the UE may be configured with a discontinuous reception (DRX) by a network, so as to reduce a power consumption of the UE. For the DRX, an inactivity timer, an on-duration timer, a cycle, a starting offset, an uplink hybrid automatic repeat reQuest (HARQ) round trip time (RTT) timer, a downlink HARQ RTT timer, an uplink repeat timer and a downlink repeat timer are configured. The UE may only monitor its physical downlink control channels (PDCCH) on its awakened durations, while may not monitor the PDCCHs any other time, thereby reducing the power consumption. The awakened durations may include running time of the on-duration timer, the inactivity timer, the uplink repeat timer, or the downlink repeat timer. For the SL, however, how to reduce the power consumption of the UE under a premise of ensuring the UE to receive data transmitted via the SL becomes a problem to be further solved by the related arts.

SUMMARY OF THE INVENTION

Examples of the present disclosure disclose a data transmission processing method, apparatus, user equipment and storage medium.

According to a first aspect of the examples of the present disclosure, a data transmission processing method is provided. The method is applicable to a first UE and includes sending a sidelink (SL) control signaling that carries a wake-up signal configuration to a second UE, where the wake-up signal configuration is associated with transmitting an SL wake-up signal from the first UE to the second UE.

Alternatively or additionally, the wake-up signal configuration includes a transmission configuration for indicating one or more transmission parameters based on which the first UE transmits the SL wake-up signal.

Alternatively or additionally, the wake-up signal configuration further includes a processing configuration for determining whether to start an on-duration timer when the second UE does not receive the SL wake-up signal transmitted by the first UE.

Alternatively or additionally, the one or more transmission parameters include at least one of transmission time information for indicating transmission starting time of the SL wake-up signal, where the transmission starting time is before starting time of a discontinuous reception (DRX) cycle, or a type configuration for indicating a type of the SL wake-up signal, where the types of the SL wake-up signal include at least one of: a first type of SL wake-up signal that triggers an on-duration timer to be started or a second type of SL wake-up signal that does not trigger the on-duration timer to be started.

Alternatively or additionally, the transmission time information includes: a transmission time offset for indicating a time offset of the transmission starting time of the SL wake-up signal with respect to the starting time of the cycle.

Alternatively or additionally, the method further includes transmitting, in response to being unable to transmit all to-be-transmitted SL data to the second UE in a current DRX cycle, the first type of SL wake-up signal to the second UE at the transmission starting time.

Alternatively or additionally, the method further includes transmitting, in response to predicting that no to-be-transmitted SL data occurs for the second UE in a next DRX cycle, the second type of SL wake-up signal to the second UE at the transmission starting time.

Alternatively or additionally, the method further includes determining a priority of the SL wake-up signal transmitted to the second UE, and determining, based on the transmission configuration and the priority of the SL wake-up signal, to transmit the SL wake-up signal to the second UE or not to transmit the SL wake-up signal to the second UE.

Alternatively or additionally, determining the priority of the SL wake-up signal transmitted to the second UE includes at least one of determining, based on a highest priority of logical channels that are associated with the second UE and have a data transmission, the priority of the SL wake-up signal, determining, based on a lowest priority of all logical channels that are associated with the second UE, the priority of the SL wake-up signal, configuring a corresponding priority of the SL wake-up signal for each second UE;

obtaining the priority of the SL wake-up signal configured by a network for each second UE, or determining, based on a communication protocol, the priority of the SL wake-up signal.

Alternatively or additionally, determining to transmit the SL wake-up signal to the second UE or not to transmit the SL wake-up signal to the second UE is further based on a priority of a Uu signal that has a resource conflict with the SL wake-up signal.

Alternatively or additionally, determining to transmit the SL wake-up signal to the second UE includes transmitting, in response to determining that the priority of the SL wake-up signal is higher than a priority threshold of the SL wake-up signal and the priority of the Uu signal is lower than a priority threshold of the Uu signal, the SL wake-up signal to the second UE.

Alternatively or additionally, determining not to transmit the SL wake-up signal to the second UE includes transmitting, in response to determining that the priority of the SL wake-up signal is lower than or equal to a priority threshold of the SL wake-up signal, the Uu signal rather than the SL wake-up signal to the second UE, transmitting, in response to determining that the priority of the Uu signal is higher than or equal to a priority threshold of the Uu signal, the Uu signal rather than the SL wake-up signal to the second UE, and transmitting, in response to determining that the priority of the SL wake-up signal is lower than or equal to the priority threshold of the SL wake-up signal and the priority of the Uu signal is higher than or equal to the priority threshold of the Uu signal, the Uu signal rather than the SL wake-up signal to the second UE.

Alternatively or additionally, transmitting, based on the transmission configuration and the priority of the SL wake-up signal, the SL wake-up signal to the second UE includes:

transmitting, in response to determining that there are a plurality of to-be-transmitted SL wake-up signals, the plurality of to-be-transmitted SL wake-up signals sequentially in accordance with their priorities.

Alternatively or additionally, the priority of the first type of SL wake-up signal and the priority of the second type of SL wake-up signal are determined in different ways.

According to a second aspect of the examples of the present disclosure, a data reception processing method is provided. The method is applicable to a second UE and includes receiving a sidelink (SL) control signaling that carries a wake-up signal configuration from a first UE, where the wake-up signal configuration is associated with transmitting an SL wake-up signal from the first UE to the second UE, and monitoring, based on the wake-up signal configuration, the SL wake-up signal from the first UE.

Alternatively or additionally, the wake-up signal configuration includes a transmission configuration for indicating one or more transmission parameters based on which the first UE transmits the SL wake-up signal.

Alternatively or additionally, the wake-up signal configuration further includes a processing configuration for determining whether to start an on-duration timer when the second UE does not receive the SL wake-up signal transmitted by the first UE.

Alternatively or additionally, the one or more transmission parameters include at least one of transmission time information for indicating transmission starting time of the SL wake-up signal, where the transmission starting time is before starting time of a discontinuous reception (DRX) cycle, or a type configuration for indicating a type of the SL wake-up signal, where the types of the SL wake-up signal include at least one of: a first type of SL wake-up signal that triggers the on-duration timer to be started or a second type of SL wake-up signal that does not trigger the on-duration timer to be started.

Alternatively or additionally, the transmission time information includes: a transmission time offset for indicating a time offset of the transmission starting time of the SL wake-up signal with respect to the starting time of the DRX cycle.

Alternatively or additionally, the method further includes determining, based on the type of the SL wake-up signal received, to or not to trigger the on-duration timer.

According to a third aspect of the examples of the present disclosure, a user equipment is provided and includes one or more processors and a memory for storing instructions executable by the one or more processors. The one or more processors are configured to implement, in response to running the executable instructions, the data transmission processing method described according to any example of the present disclosure.

It should be understood that the above general description and the following detailed description are only illustrative and explanatory, and are not intended to limit the present disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 illustrates a schematic diagram of a relationship between a time offset and transmission starting time according to an example.

FIG. 4 illustrates a flow chart of a data transmission processing method according to an example.

FIG. 7 illustrates a flow chart of a data reception processing method according to an example.

DETAILED DESCRIPTION OF THE PREFERRED EMBODIMENTS

Figure 1:
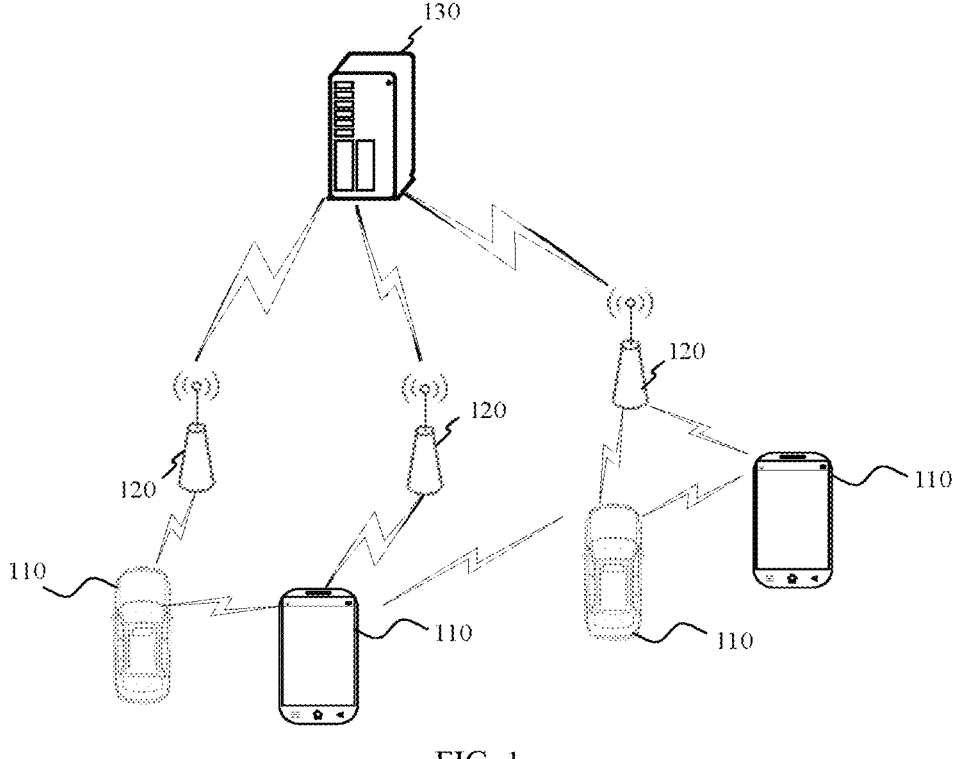
FIG. 1 is a schematic structural diagram of a wireless communication system.

Referring now to the drawings, wherein like reference numerals designate identical or corresponding parts throughout the several views.

Embodiments will be described in detail here with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a" and "the" in their singular forms in the present disclosure another example and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like another example may be used in the present disclosure to describe various information, such information should not be limited to these terms. These terms are only used to distinguish information of the same category with each other. For example, without departing from the scope of the present disclosure, first information may be referred as second information; and similarly, second information may also be referred as first information. Depending on the context, the word "if" as used herein may be interpreted as "when", "upon", or "in response to determining".

By reference to FIG. 1, a schematic structural diagram of a wireless communication system provided by an example of the present disclosure is provided. As illustrated in FIG. 1, the wireless communication system is based on cellular mobile communication technologies, and may include several user equipments (UE) 110 and several base stations 120.

The user equipment 110 may refer to a device that provides voice and/or data connectivity for a user. The user equipment 110 may communicate with one or more core networks via a radio access network (RAN). The user equipment 110 may be an Internet of Things device, such as a sensor device, a mobile phone (or called a "cellular" phone), and a computer equipped with the Internet of Things user device which may be a fixed, portable, pocket-sized, handheld, computer-built-in or vehicle-mounted device as an instance. For example, it may be a station (STA), a subscriber unit, a subscriber station, a mobile station, a mobile, a remote station, an access point, a remote terminal, an access terminal, a user terminal, a user agent, a user device, or a user equipment. The user equipment 110 may be a device as an unmanned aerial vehicle. The user equipment 110 may be a vehicle-mounted device, for example, an on-board computer with a wireless communication function, or a wireless user device connected to the on-board computer. The user equipment 110 may be a roadside device, for example, a street lamp, signal lamp or another roadside device with a wireless communication function.

The base station 120 may be a network side device in the wireless communication system. The wireless communication system may be a 4th generation mobile communication (4G) system, which is also known as a Long Term Evolution (LTE) system. The wireless communication system may be a 5G system, which is also known as a New Radio (NR) system or a 5G NR system. The wireless communication system may be a next-generation system of the 5G system. An access network in the 5G system may be referred to as a New Generation-Radio Access Network (NG-RAN).

The base station 120 may be an evolved Node-B (eNB) adopted in the 4G system. Alternatively, the base station 120 may also be a next generation Node-B (gNB) adopting a centralized and distributed architecture in the 5G system. When adopting the centralized and distributed architecture, the base station 120 usually includes a central unit (CU) and at least two distributed units (DU). The CU is provided with protocol stacks of a packet data convergence protocol (PDCP) layer, a radio link control protocol (RLC) layer, and a media access control (MAC) layer. The DU is provided with protocol stacks of a physical (PHY) layer. The examples of the present disclosure do not limit the specific implementation of the base station 120.

A wireless connection may be established between the base station 120 and the user equipment 110 through a wireless air interface. In different implementations, the wireless air interface is based on the fourth-generation mobile communication network technology (4G) standards; or, the wireless air interface is based on the fifth-generation mobile communication network technology (5G) standards, such as the wireless air interface is a new radio; or, the wireless air interface may be based on next-generation mobile communication network technology standards of 5G.

In some examples, an end-to-end connection may also be established between the user equipments 110, such as, a vehicle to vehicle (V2V) communication, a vehicle to roadside equipment (V2I) communication and a vehicle to pedestrian (V2P) communication in vehicle to everything (V2X) communication.

The above-mentioned user equipment may be regarded as a terminal in the following examples.

In some examples, the above wireless communication system may further include a network management device 130.

The several base stations 120 are connected to the network management device 130 separately. The network management device 130 may be a core network device in the wireless communication system. For example, the network management device 130 may be a mobility management entity (MME) in an evolved packet core (EPC) network. Alternatively, the network management device may be another core network device, such as a serving gate way (SGW), a public data network gate way (PGW), a policy and charging rules function unit (PCRF) or a home subscriber server (HSS). The implemented forms of the network management device 130 are not limited by the examples of the present disclosure.

Figure 2:
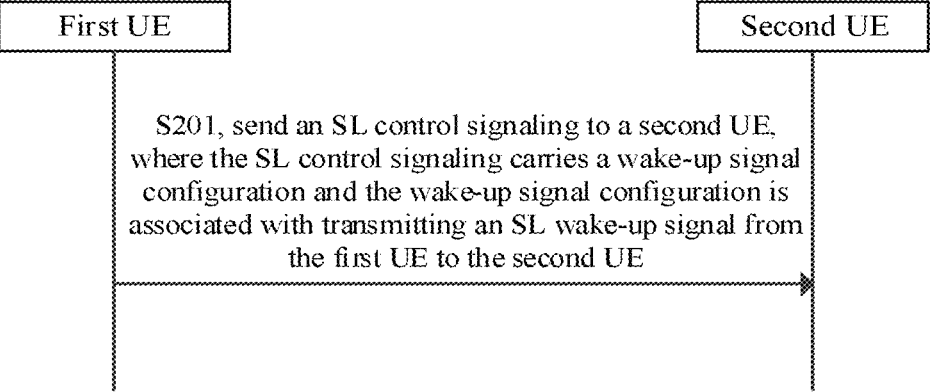
FIG. 2 illustrates a flow chart of a data transmission processing method according to an example.

As illustrated in FIG. 2, this example provides a data transmission processing method, which is applicable to a first UE, and the method includes the following step.

At step S201, a sidelink (SL) control signaling is sent to a second UE. The SL control signaling carries a wake-up signal configuration, and the wake-up signal configuration is associated with transmitting an SL wake-up signal from the first UE to the second UE.

Either the first UE or the second UE may be a mobile phone, a computer, a server, a transceiver device, a tablet device, or a medical device, etc. There is no restriction on the type of the first UE or the second UE in the example except that both the first UE and the second UE are UEs in a sidelink.

The wake-up signal configuration is associated with transmitting the SL wake-up signal from the first UE to the second UE. For example, the wake-up signal configuration may indicate whether the first UE is to transmit the SL wake-up signal to the second UE, the wake-up signal configuration may include configuration parameters for receiving or transmitting the SL wake-up signal, and/or the wake-up signal configuration may indicate a response operation of the second UE associated with the SL wake-up signal.

The SL wake-up signal includes: a first type of SL wake-up signal that triggers an on-duration timer to be started, or a second type of SL wake-up signal that does not trigger the on-duration timer to be started.

The second UE is in a wake-up state when the on-duration timer is triggered, and the second UE in the wake-up state is capable of monitoring channels. For example, the second UE receives data transmitted on an SL or a physical downlink control channel (PDCCH). When the on-duration timer is not triggered, the second UE is in a sleep state (that is, a non-wake-up state), and in this case, the second UE does not monitor the foregoing signals. Thus, the second UE may be kept in a dormant state when it is not expected to receive data, so that the energy consumption of the second UE can be reduced.

According to the example of the present disclosure, therefore, by sending one wake-up signal configuration from the first UE to the second UE, it enables the second UE to learn whether the first UE is to transmit the SL wake-up signal, and moreover, enables the second UE to control itself in the wake-up state or in the sleep state according to a reception of the SL wake-up signal and/or the received SL wake-up signal based on the SL wake-up signal configuration, which can reduce the power consumption of the second UE by monitoring the communications on the SL in the wake-up state and stopping monitoring the SL in the sleep state.

In some examples, the wake-up signal configuration includes a transmission configuration for indicating one or more transmission parameters based on which the first UE transmits the SL wake-up signal. The transmission parameter may include one or more parameters.

The one or more transmission parameters include, but are not limited to, at least one of:

a resource configuration for indicating communication resources used to transmit the SL wake-up signal;

transmission time information for indicating transmission starting time of the SL wake-up signal, where the transmission starting time is before starting time of a discontinuous reception (DRX) cycle; and a type configuration for indicating a type of the SL wake-up signal, where the types of the SL wake-up signal include: a first type of SL wake-up signal that triggers the on-duration timer to be started and/or a second type of SL wake-up signal that does not trigger the on-duration timer to be started.

The communication resources may include: time-frequency resources, and/or port resources, etc.

In one example, sequence numbers or information contents carried by the first type of SL wake-up signal and the second type of SL wake-up signal are different. Thus, the UE may distinguish the type of SL wake-up signal according to the sequence number corresponding to the SL wake-up signal or the information content carried by the SL wake-up signal, and decide whether to trigger the on-duration timer based on a result of the distinction.

In one example, the transmission time information includes: a transmission time offset for indicating a time offset of the transmission starting time of the SL wake-up signal with respect to the starting time of the DRX cycle.

For example, as illustrated in FIG. 3, one DRX cycle is from T1 to T2, with T1 as the starting time of the DRX cycle. In this application scenario, the time offset is 2 ms, and thus T0, which is before T1 by 2 ms, is the transmission starting time of the SL wake-up signal.

Of course, in other examples, the time offset may also be a predetermined number of units in time domain. The units in time domain may include time slots, symbols, etc.

In the examples of the present disclosure, therefore, after receiving the wake-up signal configuration, the second UE may monitor the SL wake-up signal received on the SL in accordance with the transmission time information included in the wake-up signal configuration. For example, the second UE may monitor the SL wake-up signal at the time corresponding to the time offset before the starting time of the DRX cycle. In this way, the second UE may be informed in which time period the SL wake-up signal may be monitored, so that the energy consumption of the second UE can be further reduced and a success rate of receiving the SL wake-up signal can be improved.

In some another examples, the wake-up signal configuration further includes:

a processing configuration for determining whether to start the on-duration timer when the second UE does not receive the SL wake-up signal transmitted by the first UE.

In one example, the processing configuration may be used to determine to start the on-duration timer when the second UE does not receive the SL wake-up signal transmitted by the first UE.

For example, in one application scenario, when the first UE determines that there is SL data to be transmitted to the second UE within a preset time range, this processing configuration is used to determine to start the on-duration timer when the second UE does not receive the SL wake-up signal transmitted by the first UE. For example, the preset time range is a short period of time, such as a duration of one or more symbols, or a time period with millisecond as a time unit.

In another example, the processing configuration may be used to determine not to start the on-duration timer when the second UE does not receive the SL wake-up signal transmitted by the first UE.

For example, in one application scenario, when the first UE determines no SL data to be transmitted to the second UE within the preset time range, this processing configuration is used to determine not to start the on-duration timer when the second UE does not receive the SL wake-up signal transmitted by the first UE.

According to the examples of the present disclosure, therefore, it is also possible to determine whether to start the on-duration timer of the second UE based on the processing configuration in the wake-up signal configuration, so as to avoid the second UE from being always kept in the wake-up state, thereby reducing the energy consumption of the second UE.

In some another examples, the wake-up signal configuration may further include a power saving-radio network temporary identity (PS-RNTI). Thus, when receiving the wake-up signal configuration, the second UE may determine, according to the PS-RNTI, whether the wake-up signal configuration is its own wake-up signal configuration.

In some examples, as illustrated in FIG. 4, the data transmission processing method may further include the following step.

At step S202, the first type of SL wake-up signal is transmitted to the second UE at the transmission starting time in response to being unable to transmit all to-be-transmitted SL data to the second UE in a current DRX cycle.

The second UE is configured with the wake-up signal configuration. After receiving the wake-up signal configuration, the second UE monitors whether the first type of SL wake-up signal occurs at the transmission starting time before the starting time of the DRX cycle according to the wake-up signal configuration.

The first type of wake-up signal is used to instruct to start the on-duration timer of the second UE.

Therefore, only when there is the data to be received by the second UE in a certain DRX cycle, the first type of SL wake-up signal that triggers the on-duration timer to be started is transmitted at the transmission starting time corresponding to the DRX cycle. Thus, the second UE is waken up only when receiving data, without keeping the second UE in the wake-up state all the time, thereby reducing the energy consumption of the second UE while ensuring that the data is received by the second UE.

In addition, by transmitting the first type of SL wake-up signal at the transmission starting time before the starting time of the DRX cycle, it can enable the second UE to learn whether it is expected to be waken up in the corresponding DRX cycle to receive the SL data, so as to avoid to wake up the second UE in every DRX cycle, thereby reducing the energy consumption of the second UE and increasing the success rate of receiving the first type of SL wake-up signal.

Figure 5:
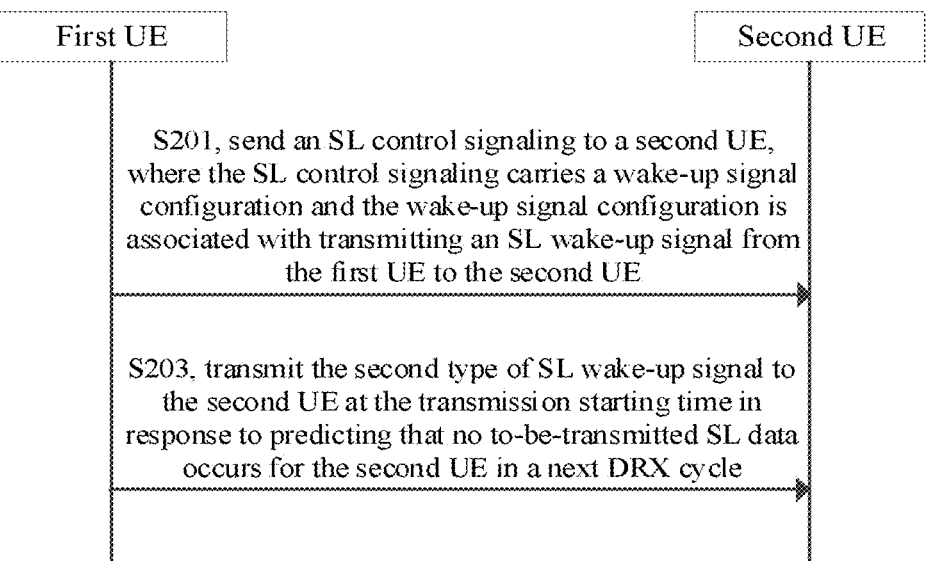
FIG. 5 illustrates a flow chart of a data transmission processing method according to an example.

In some another examples, as illustrated in FIG. 5, the data transmission processing method may further include the following step.

At step S203, the second type of SL wake-up signal is transmitted to the second UE at the transmission starting time in response to predicting that no to-be-transmitted SL data occurs for the second UE in a next DRX cycle.

The second UE is configured with the wake-up signal configuration.

The second type of wake-up signal is used to indicate not to start the on-duration timer of the second UE.

Therefore, when it is predicted that no data is received by the second UE in a certain DRX cycle, the second type of SL wake-up signal that does not trigger the on-duration timer is transmitted at the transmission starting time corresponding to the DRX cycle. Thus, when there is not data to be received by the second UE, the second UE is kept in the dormant state instead of in the wake-up state all the time, which can reduce the energy consumption of the second UE.

In addition, by transmitting the second type of SL wake-up signal at the transmission starting time before the starting time of the DRX cycle, it can enable the second UE to learn whether to stay in sleep in the corresponding DRX cycle, so as to avoid the second UE from being waken up in every DRX cycle, thereby improving the success rate of receiving the second type of SL wake-up signal and reducing the energy consumption of receiving the second SL wake-up signal.

Figure 6:
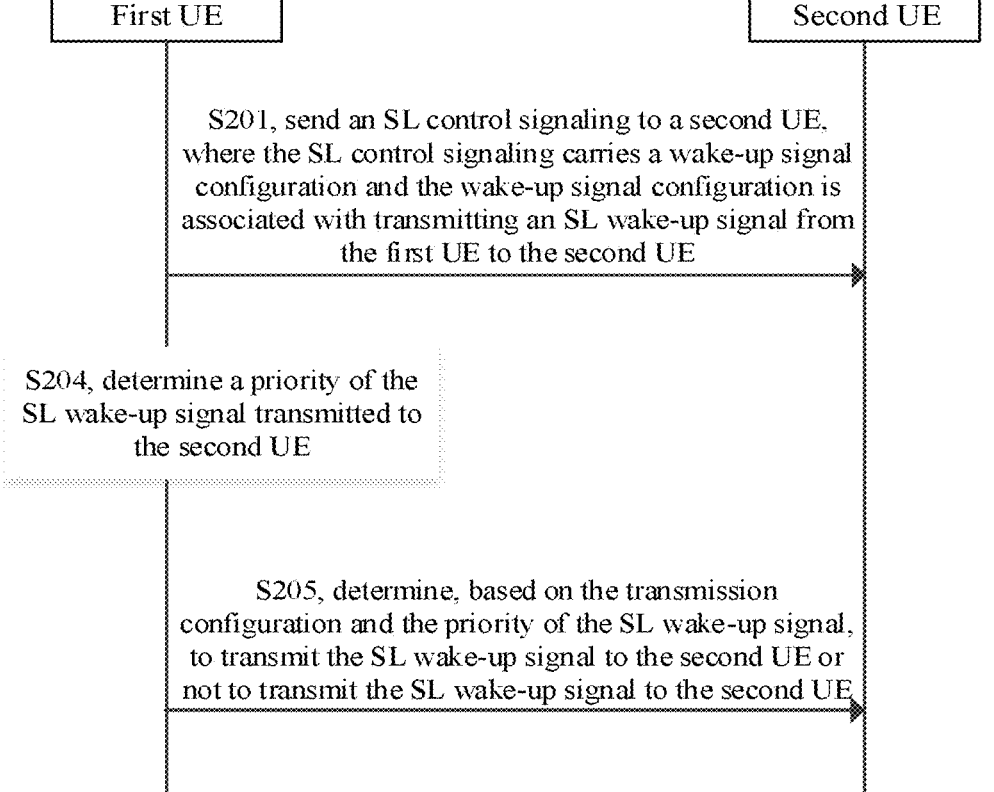
FIG. 6 illustrates a flow chart of a data transmission processing method according to an example.

In some examples, as illustrated in FIG. 6, the data transmission processing method may further include the following steps.

At step S204, a priority of the SL wake-up signal transmitted to the second UE is determined.

At step S205, it is determined, based on the transmission configuration and the priority of the SL wake-up signal, to transmit the SL wake-up signal to the second UE or not to transmit the SL wake-up signal to the second UE.

In one example, step S204 includes at least one of the following determining, based on a highest priority of logical channels that are associated with the second UE and have a data transmission, the priority of the SL wake-up signal, determining, based on a lowest priority of all logical channels that are associated with the second UE, the priority of the SL wake-up signal, configuring a corresponding priority of the SL wake-up signal for each second UE, obtaining the priority of the SL wake-up signal configured by a network for each second UE, or determining, based on a communication protocol, the priority of the SL wake-up signal.

The logical channels include: SL logical channels and/or Uu logical channels. An SL logical channel is between a UE and another UE; and a Uu logical channel is between a UE and a base station.

The logical channels associated with the second UE may include the logical channels of the second UE. For example, the logical channels associated with the second UE include logical channels between other UEs and the second UE, and/or logical channels between the second UE and the base station. The other UEs are the UEs that have established an SL connection with the second UE.

Therefore, determining the priority of the SL wake-up signal based on the highest priority of the logical channels that are associated with the second UE and have a data transmission actually means to determine the priority of the SL wake-up signal based on the highest priority of the logical channels of the second UE having the data transmission. Determining the priority of the SL wake-up signal based on the lowest priority of all the logical channels that are associated with the second UE actually means to determine the priority of the SL wake-up signal based on the lowest priority of all the logical channels of the second UE.

A level of the priority of the SL wake-up signal represents an urgency degree of receiving the SL wake-up signal by the second UE. The level of the priority of the SL wake-up signal is positively correlated with the urgency degree of receiving the SL wake-up signal by the second UE.

As an example, the logical channels of the second UE include logical channel 1, logical channel 2, logical channel 3, and logical channel 4. The order of the priorities of the logical channels is: the priority of logical channel 1 is higher priority than that of logical channel 2, the priority of logical channel 2 is higher priority than that of logical channel 3, and the priority of logical channel 3 is higher priority than that of logical channel 4. There is the data transmission in logical channel 1, logical channel 2, and logical channel 3. Therefore, the first UE may take the priority of logical channel 1 as the priority of the SL wake-up signal.

For example, when the first UE transmits the first type of SL wake-up signal that triggers the on-duration timer to be started to the second UE, it may be determined to select the highest priority of the logical channels associated with the second UE and having the data transmission as the priority of the first type of SL wake-up signal.

As another example, in the above example, the first UE may take the priority of logical channel 4 as the priority of the SL wake-up signal.

For example, when the first UE transmits the second type of SL wake-up signal that does not trigger the on-duration timer to be started to the second UE, the lowest priority of all the logical channels associated with the second UE may be taken as the priority of the second type of SL wake-up signal.

Configuring the corresponding priority of the SL wake-up signal for each second UE may means to configure the corresponding priority for the SL wake-up signal transmitted to each second UE according to identification information of the second UE.

Obtaining the priority of the SL wake-up signal configured by the network for each second UE may means to obtain the priority of the SL wake-up signal allocated and configured for each second UE by the base station.

In this way, various determining schemes may be adopted to determine the corresponding priority of the SL wake-up signal, so that the first UE determines the transmission of the SL wake-up signal based on the priority of the SL wake-up signal, thereby more reasonably determining whether to transmit the SL wake-up signal.

In some examples, the priority of the first type of SL wake-up signal and the priority of the second type of SL wake-up signal are determined in different ways.

The determining schemes are identical with that shown in step S204 in the foregoing example.

For example, the priority of the first type of SL wake-up signal is the same as the highest priority of the logical channels associated with the second UE and having the data transmission, while the priority of the second type of SL wake-up signal is the same as the lowest priority of all the logic channels associated with the second UE.

For another example, the priority of the first type of SL wake-up signal is determined based on the provisions of the communication protocol, while the priority of the second type of SL wake-up signal is configured by the network for each second UE.

Therefore, different determining schemes may be adopted to determine the priority for these two types of SL wake-up signals respectively, so as to enable the first UE to select and transmit the corresponding type of SL wake-up signal based on different application scenarios.

In some examples, step S205 includes transmitting, in response to determining that there are a plurality of to-be-transmitted SL wake-up signals, the plurality of to-be-transmitted SL wake-up signals sequentially in accordance with their priorities.

Transmitting the plurality of to-be-transmitted SL wake-up signals sequentially in accordance with their priorities includes: transmitting the SL wake-up signals sequentially in a descending priority order according to the priorities of the plurality of to-be-transmitted SL wake-up signals. The SL wake-up signals and the second UEs are in a one-to-one correspondence.

The level of the priority of the SL wake-up signal is positively correlated with the urgency degree of receiving the SL wake-up signal by the second UE. For example, more urgently the second UE receives the SL data and/or more important the received SL data is according to a prediction, the higher the urgency degree of receiving the SL wake-up signal by the second UE is determined, and the higher the level of the priority of the SL wake-up signal is. Thus, the priority order of the SL wake-up signals can be determined more accurately, so that the SL wake-up signals that are more urgent and/or more important can be transmitted first, thereby improving a service quality of data transmission in general.

And, when there are the SL wake-up signals corresponding to a plurality of second UEs waiting to be transmitted, the SL wake-up signals with higher priorities are selected to be transmitted first according to the priority order of the SL wake-up signals, so as to reduce conflicts of the transmission resources due to the simultaneous transmissions of the plurality of SL wake-up signals, reduce channel congestions and improve an efficiency of transmitting the SL wake-up signals.

In one example, the above step 205 includes:

selecting and transmitting the SL wake-up signals with the highest priority from the plurality of to-be-transmitted SL wake-up signals in response to determining that there are the plurality of to-be-transmitted SL wake-up signals. Thus, it can ensure that the SL wake-up signals with the highest priority are transmitted first.

In some examples, determining to transmit the SL wake-up signal to the second UE or not to transmit the SL wake-up signal to the second UE is further based on a priority of a Uu signal that has a resource conflict with the SL wake-up signal.

For example, in one example, step S205 includes:

determining to transmit the SL wake-up signal to the second UE or not to transmit the SL wake-up signal to the second UE based on the priority of the SL wake-up signal and the priority of the Uu signal in response to determining that there is a resource conflict between transmitting the SL wake-up signal and transmitting the Uu signal.

The priority of the Uu signal is a priority of data transmission between the UE and the base station. The priority of the Uu signal may be determined based on the logical channels between the UE and the base station. For example, the priority of the Uu signal is consistent with the priority of a logical channel between the Uu and the base station.

The resource conflict means that the time-frequency resources for transmitting the SL wake-up signal are the same as the time-frequency resources for transmitting the Uu signal.

When the same time-frequency resources are utilized for transmitting the SL wake-up signal and the Uu signal, an interference occurs at this time, and this mutual interference may result in failures of transmitting at least one of the SL wake-up signal or the Uu signal.

Therefore, in the examples of the present disclosure, when there is the resource conflict between transmitting the SL wake-up signal and transmitting the Uu signal, the priority of the SL wake-up signal and that of the Uu signal may be compared, so as to determine whether to transmit the SL wake-up signal based on the priorities of these two kinds of signals. In this way, only one of the SL wake-up signal and the Uu signal can be transmitted on the same time-frequency resources, so that the success rate of transmitting either the SL wake-up signal or the Uu signal can be ensured.

In one example, determining to transmit the SL wake-up signal to the second UE includes:

transmitting the SL wake-up signal to the second UE in response to determining that the priority of the SL wake-up signal is higher than a priority threshold of the SL wake-up signal and the priority of the Uu signal is lower than a priority threshold of the Uu signal.

Therefore, when there is a resource conflict between transmitting the SL wake-up signal and transmitting the Uu signal, the SL wake-up signal with the higher priority may be selected and transmitted, which can greatly reduce the interference caused by transmitting two kinds of signals at the same time, and improve the success rate of transmitting the SL wake-up signal.

In another example, determining not to transmit the SL wake-up signal to the second UE includes:

transmitting the Uu signal rather than the SL wake-up signal to the second UE in response to determining that the priority of the SL wake-up signal is lower than or equal to the priority threshold of the SL wake-up signal;

transmitting the Uu signal rather than the SL wake-up signal to the second UE in response to determining that the priority of the Uu signal is higher than or equal to the priority threshold of the Uu signal; and transmitting the Uu signal rather than the SL wake-up signal to the second UE in response to determining that the priority of the SL wake-up signal is lower than or equal to the priority threshold of the SL wake-up signal and the priority of the Uu signal is higher than or equal to the priority threshold of the Uu signal.

Therefore, when there is the resource conflict between transmitting the SL wake-up signal and transmitting the Uu signal, the Uu signal with the higher priority may be selected, which can greatly reduce the interference caused by transmitting two kinds of signals at the same time, and improve the efficiency of transmitting the signal with the higher priority.

In some another examples, determining to transmit the SL wake-up signal to the second UE or not to transmit the SL wake-up signal to the second UE is also based on the priority of the Uu signal that has a transmission power conflict with the SL wake-up signal.

When it is to transmit the SL wake-up signal and the Uu signal at the same time but the transmission power of the first UE only supports to transmit one kind of signal, there is the transmission power conflict between the SL wake-up signal and the Uu signal. In this case, transmitting both the SL wake-up signal and the Uu signal at the same time may result in that both of the two kinds of signals fail to be transmitted.

Therefore, in an application scenario, in response to determining that there is the conflict between the transmission power of the SL wake-up signal and the transmission power of the Uu signal, it determines to transmit the SL wake-up signal to the second UE or not to transmit the SL wake-up signal to the second UE based on the priority of the SL wake-up signal and the priority of the Uu signal. In this way, in the examples of the present disclosure, when there is the conflict between the transmission power of the SL wake-up signal and the transmission power of the Uu signal, the signal with the higher priority is selected and transmitted based on the priorities of the SL wake-up signal and the Uu signal, so as to ensure the success rate of transmitting the SL wake-up signal or the Uu signal.

It should be noted that the following data reception processing methods are applicable to the second UE, but is similar to the description of the above data transmission processing method applicable to the first UE. The technical details not disclosed in the examples of the data reception processing methods applicable to the second UE in the present disclosure make reference to the description of the examples of the data transmission processing methods applicable to the first UE in the present disclosure, which will not be described in detail here. These details are also included in the scope of the disclosure of the present disclosure.

As illustrated in FIG. 7, the examples of the present disclosure also provide a data reception processing method, which is applicable to a second UE and includes the following steps.

At step S301, an SL control signaling is received from a first UE. The SL control signaling carries a wake-up signal configuration, and the wake-up signal configuration is associated with transmitting an SL wake-up signal from the first UE to the second UE.

At step S302: the SL wake-up signal from the first UE is monitored based on the wake-up signal configuration.

In some examples, the wake-up signal configuration includes:

a transmission configuration for indicating one or more transmission parameters based on which the first UE transmits the SL wake-up signal.

In some examples, the wake-up signal configuration further includes:

a processing configuration for determining whether to start the on-duration timer when the second UE does not receive the SL wake-up signal transmitted by the first UE.

In some examples, the one or more transmission parameters include:

transmission time information for indicating transmission starting time of the SL wake-up signal, where the transmission starting time is before starting time of a DRX cycle; and/or a type configuration for indicating a type of the SL wake-up signal, where the types of the SL wake-up signal include: a first type of SL wake-up signal that triggers an on-duration timer to be started and/or a second type of SL wake-up signal that does not trigger the on-duration timer to be started.

In some examples, the transmission time information includes: a transmission time offset for indicating a time offset of the transmission starting time of the SL wake-up signal with respect to the starting time of the DRX cycle.

In some examples, the method further includes:

determining, based on the type of the SL wake-up signal received, to or not to trigger the on-duration timer.

One detailed example is provided below in combination with any of the foregoing examples.

In this example, the lower the priority number, the higher the priority level. For example, the 1st priority is higher than the 2nd priority, and the 2nd priority is higher than the 3rd priority.

Figure 8:
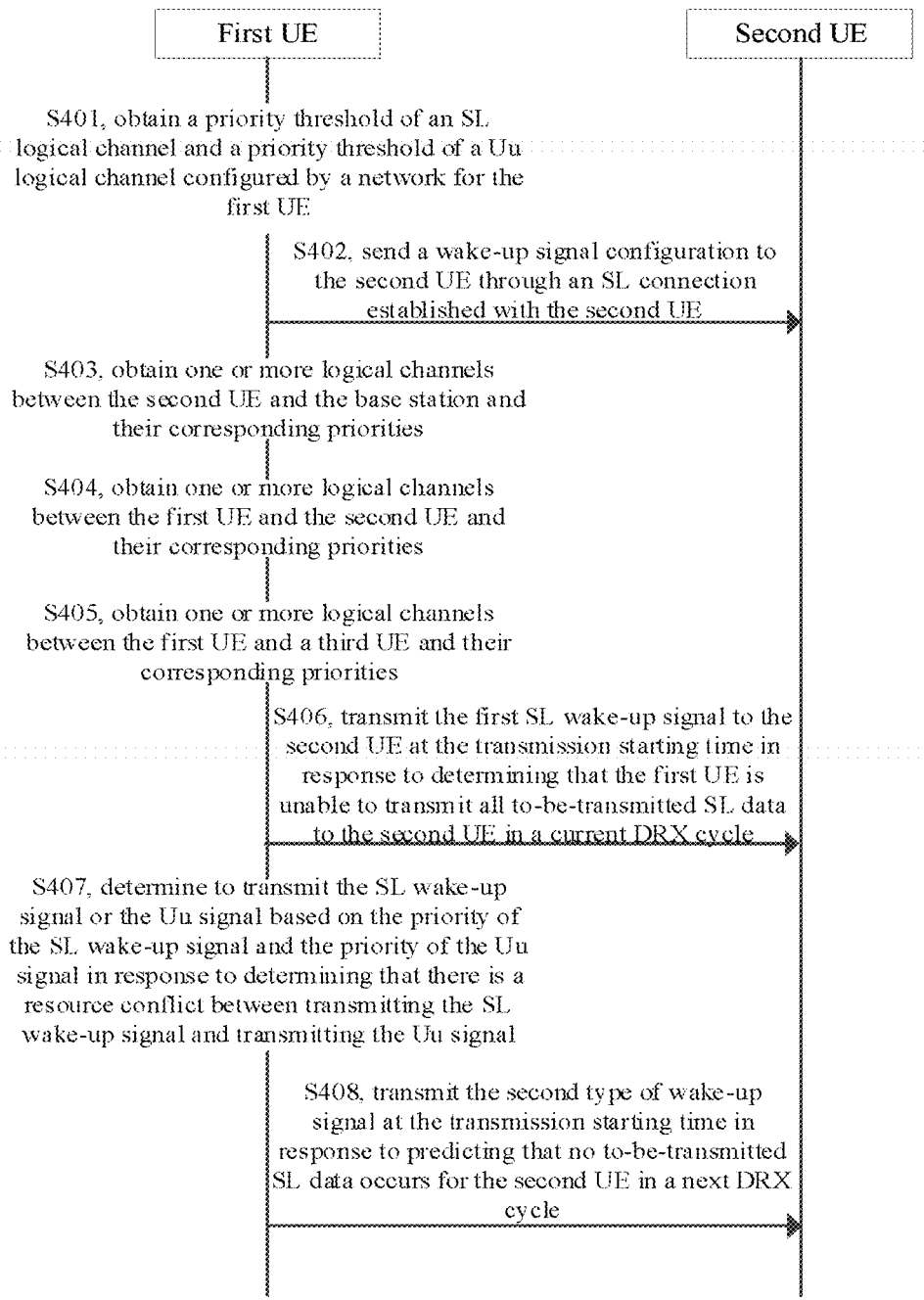
FIG. 8 illustrates a flow chart of a data transmission processing method according to an example.

As illustrated in FIG. 8, the example of the present disclosure also provides a data transmission processing method, which is applicable to the first UE, and includes the following steps.

At step S401, a priority threshold of an SL logical channel and a priority threshold of a Uu logical channel configured by a network for the first UE are obtained.

Here, the priority threshold of the SL logical channel and the priority threshold of the Uu logical channel configured by the network for the first UE are obtained by the first UE and are the 2nd priority and the 3rd priority, respectively. The 2nd priority is higher than the 3rd priority.

The network may refer to a base station.

At step S402, a wake-up signal configuration is sent to the second UE through an SL connection established with the second UE. Here, the first UE establishes an SL connection with the second UE and establishes an SL connection the third UE separately.

The wake-up signal configuration includes a transmission configuration and a processing configuration. The transmission configuration is used to indicate a time offset of transmission starting time of the SL wake-up signal with respect to a starting time of a DRX cycle. The processing configuration is used to determine to start an on-duration timer when the second UE does not receive the SL wake-up signal transmitted by the first UE.

The time offset is 2 ms before the starting time of each DRX cycle. Therefore, the second UE monitors the SL wake-up signal by 2 ms before the starting time of each DRX cycle.

At step S403, one or more logical channels between the second UE and the base station and their corresponding priorities are obtained.

Here, the logical channels between the second UE and the base station includes logical channel 1 and logical channel 3. The priority of logical channel 1 is the 2nd priority, and the priority of logical channel 3 is the 4th priority.

The first UE receives first information sent by the second UE or the network. The first information indicates the logical channels between the second UE and the base station and their corresponding priorities. Therefore, the first UE learns the logical channels between the second UE and the base station and their corresponding priorities based on the received first information.

At step S404, one or more logical channels between the first UE and the second UE and their corresponding priorities are obtained.

Here, the logical channels between the first UE and the second UE are logical channel 3, logical channel 4 and logical channel 5. The priority of logical channel 3 is the 1st priority, the priority of logical channel 4 is the 3rd priority, and the priority of logical channel 5 is the 9th priority.

At step S405, one or more logical channels between the first UE and a third UE and their corresponding priorities are obtained.

Here, the one or more logical channels between the first UE and the third UE is logical channel 6. The priority of logical channel 6 is the 2nd priority.

At step S406, the first SL wake-up signal is transmitted to the second UE at the transmission starting time in response to determining that the first UE is unable to transmit all to-be-transmitted SL data to the second UE in a current DRX cycle. Here, the SL wake-up signal includes a first type of SL wake-up signal for indicating to start the on-duration timer.

In an example, when there are the data transmission on logical channel 3 and logical channel 4 of the second UE, the SL wake-up signal has the 1st priority corresponding to the logical channel 3.

At step S407, it is determined to transmit the SL wake-up signal or the Uu signal based on the priority of the SL wake-up signal and the priority of the Uu signal in response to determining that there is a resource conflict between transmitting the SL wake-up signal and transmitting the Uu signal.

In an example, when the first UE is to transmit the SL wake-up signal on logical channel 4 and transmits the Uu signal on logical channel 2, since the priority of logical channel 4 is the 3rd priority which is less than the priority threshold of the SL logical channel, i.e., the 2nd priority, the first UE transmits the Uu signal on logical channel 2.

The priority of the SL wake-up signal is the priority of the logical channel on which the SL wake-up signal is to be transmitted, and the priority of the Uu signal is the priority of the logical channel on which the Uu signal is to be transmitted.

At step S408, the second type of wake-up signal is transmitted at the transmission starting time in response to predicting that no to-be-transmitted SL data occurs for the second UE in a next DRX cycle.

Here, the SL wake-up signal includes the second type of SL wake-up signal for indicating not to start the on-duration timer.

In an example, at the same time as the above step S408, the first UE transmits the first SL wake-up signal to the third UE in response to determining that there is the to-be-transmitted SL data for the third UE in the current DRX cycle but the first UE is unable to transmit all the to-be-transmitted SL data to the third UE in the DRX cycle.

In another example, in the above step S408, one SL wake-up signal with the higher priority is transmitted based on the priority of the SL wake-up signal of the second UE and the priority of the SL wake-up signal of the third UE in response to predicting that there are both the SL data transmitted for the second UE and the SL data transmitted for the third UE in a next DRX cycle.

In the examples of the present disclosure, the wake-up signal configuration may be transmitted in the SL from the first UE to the second UE, so as to avoid the second UE from being kept in the wake-up state all the time. It is determined to start the on-duration timer of the second UE only when the first SL wake-up signal is transmitted or the first SL wake-up signal transmitted by the first UE is not received to start the on-duration timer, so that the second UE is waken up, thereby reducing the energy consumption of the second UE.

In addition, when the wake-up signal configuration carries the transmission time information on transmitting the SL wake-up signal, it can also enable the second UE to monitor the SL wake-up signal during a specified period before the starting time of the DRX cycle, which reduces the power consumption of monitoring the SL wake-up signal, thereby further reducing the energy consumption of the second UE.

In the examples of the present disclosure, when there is a conflict between the SL wake-up signal and the Uu signal, the signal with the higher priority may be selected and transmitted, so as to implement a more reasonable transmission strategy.

In the examples of the present disclosure, when there are a plurality of target UEs, i.e., the second UE and the third UE, the first UE selects the UE to which the SL data is to be transmitted and transmits the SL wake-up signal to the UE. Alternatively, when each of the plurality of target UEs has the SL data transmission, the SL wake-up signal with the higher priority is transmitted according to the priorities of the SL wake-up signals corresponding to various target UEs, which can reduce the conflicts of transmitting the SL wake-up signal, and at the same time, ensure that the SL wake-up signal with the higher priority is transmitted first, and improve the success rate of transmitting the SL wake-up signal with the higher priority.

Figure 9:
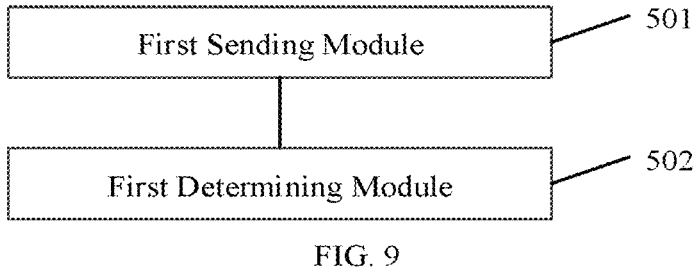
FIG. 9 illustrates a block diagram of a data transmission processing apparatus according to an example.

As illustrated in FIG. 9, the examples of the present disclosure provide a data transmission processing apparatus, which is applicable to a first UE and includes:

a first sending module 501 that is configured to send an SL control signaling to a second UE. The SL control signaling carries a wake-up signal configuration. The wake-up signal configuration is associated with transmitting an SL wake-up signal from the first UE to the second UE.

In some examples, the wake-up signal configuration includes:

a transmission configuration for indicating one or more transmission parameters based on which the first UE transmits the SL wake-up signal.

In some examples, the wake-up signal configuration further includes:

a processing configuration for determining whether to start an on-duration timer when the second UE does not receive the SL wake-up signal transmitted by the first UE.

In some examples, the one or more transmission parameters include:

transmission time information for indicating transmission starting time of the SL wake-up signal, where the transmission starting time is before starting time of a DRX cycle; and/or a type configuration for indicating a type of the SL wake-up signal, where the types of the SL wake-up signal include: a first type of SL wake-up signal that triggers the on-duration timer to be started and/or a second type of SL wake-up signal that does not trigger the on-duration timer to be started.

In some examples, the transmission time information includes: a transmission time offset for indicating a time offset of the transmission starting time of the SL wake-up signal with respect to the starting time of the DRX cycle.

In some examples, the first sending module 501 is configured to transmit, in response to being unable to transmit all to-be-transmitted SL data to the second UE in a current DRX cycle, the first type of SL wake-up signal to the second UE at the transmission starting time.

In some examples, the first sending module 501 is configured to transmit, in response to predicting that no to-be-transmitted SL data occurs for the second UE in a next DRX cycle, the second type of SL wake-up signal to the second UE at the transmission starting time.

In some examples, the apparatus further includes:

a first determining module 502 that is configured to determine a priority of the SL wake-up signal transmitted to the second UE.

Therefore, the first sending module 501 is configured to determine, based on the transmission configuration and the priority of the SL wake-up signal, to transmit the SL wake-up signal to the second UE or not to transmit the SL wake-up signal to the second UE.

In some examples, the first determining module 502 is configured to perform at least one of:

determining, based on a highest priority of logical channels that are associated with the second UE and have a data transmission, the priority of the SL wake-up signal;

determining, based on a lowest priority of all logical channels that are associated with the second UE, the priority of the SL wake-up signal;

configuring a corresponding priority of the SL wake-up signal for each second UE;

obtaining the priority of the SL wake-up signal configured by a network for each second UE; or determining, based on a communication protocol, the priority of the SL wake-up signal.

In some examples, determining to transmit the SL wake-up signal to the second UE or not to transmit the SL wake-up signal to the second UE is further based on a priority of a Uu signal that has a resource conflict with the SL wake-up signal.

In some examples, the first sending module 501 is configured to transmit, in response to determining that the priority of the SL wake-up signal is higher than the priority threshold of the SL wake-up signal and the priority of the Uu signal is lower than the priority threshold of the Uu signal, the SL wake-up signal to the second UE.

In some examples, the first sending module 501 is configured to perform one of:

transmitting the Uu signal rather than the SL wake-up signal to the second UE in response to determining that the priority of the SL wake-up signal is lower than or equal to the priority threshold of the SL wake-up signal;

transmitting the Uu signal rather than the SL wake-up signal to the second UE in response to determining that the priority of the Uu signal is higher than or equal to the priority threshold of the Uu signal; and transmitting the Uu signal rather than the SL wake-up signal to the second UE in response to determining that the priority of the SL wake-up signal is lower than or equal to the priority threshold of the SL wake-up signal and the priority of the Uu signal is higher than or equal to the priority threshold of the Uu signal.

In some examples, the first sending module 501 is configured to transmit, in response to determining that there are a plurality of to-be-transmitted SL wake-up signals, the plurality of to-be-transmitted SL wake-up signals sequentially in accordance with their priorities.

In some examples, the priority of the first type of SL wake-up signal and the priority of the second type of SL wake-up signal are determined in different ways.

Figure 10:
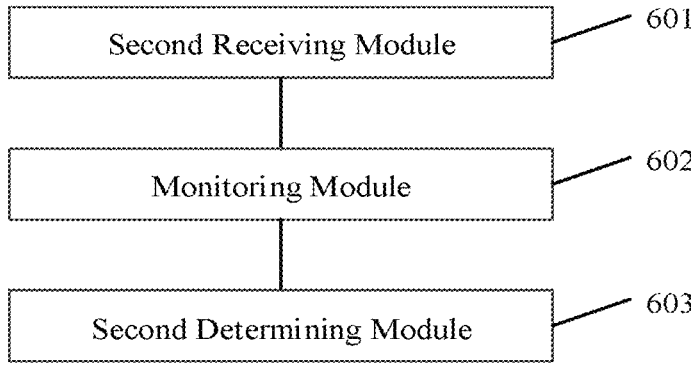
FIG. 10 illustrates a block diagram of a data reception processing apparatus according to an example.

As illustrated in FIG. 10, the examples of the present disclosure provide a data reception processing apparatus, which is applicable to a second UE and includes:

a second receiving module 601, configured to receive an SL control signaling from a first UE, where the SL control signaling carries a wake-up signal configuration, and the wake-up signal configuration is associated with transmitting an SL wake-up signal from the first UE to the second UE; and a monitoring module 602, configured to monitor, based on the wake-up signal configuration, the SL wake-up signal from the first UE.

In some examples, the wake-up signal configuration includes:

a transmission configuration for indicating one or more transmission parameters based on which the first UE transmits the SL wake-up signal.

In some examples, the wake-up signal configuration further includes:

a processing configuration for determining whether to start an on-duration timer when the second UE does not receive the SL wake-up signal transmitted by the first UE.

In some examples, the one or more transmission parameters include:

transmission time information for indicating transmission starting time of the SL wake-up signal, where the transmission starting time is before starting time of a DRX cycle; and/or a type configuration for indicating a type of the SL wake-up signal, where the types of the SL wake-up signal include: a first type of SL wake-up signal that triggers the on-duration timer to be started and/or a second type of SL wake-up signal that does not trigger the on-duration timer to be started.

In some examples, the transmission time information includes: a transmission time offset for indicating a time offset of the transmission starting time of the SL wake-up signal with respect to the starting time of the DRX cycle.

In some examples, the apparatus further includes:

a second determining module 603 that is configured to determine, based on the type of the SL wake-up signal received, to or not to trigger the on-duration timer.

With respect to the apparatus in the foregoing examples, the specific manner in which each module performs its operation has been described in detail in the examples of the related methods, and will not be further described in detail here.

The examples of the present disclosure provide a user device, including:

one or more processors; and a memory for storing instructions executable by the one or more processors.

The one or more processors are configured to implement, when running the executable instructions, the data transmission processing method or the data reception processing method according to any example of the present disclosure.

The user device here may be the first UE or the second UE in the foregoing examples.

The one or more processors may include various types of storage media. The storage medium is a non-transitory computer storage medium that is capable of keeping information thereon memorized after the user device is powered off. The user device includes a base station or a user equipment.

The one or more processors may be connected to the memory through a bus or the like, and are used to read an executable program stored on the memory, for example, at least one of the methods illustrated in FIGS. 2, 4 to 8.

The examples of the present disclosure further provide a computer storage medium storing a computer executable program. The executable program implements, when being executed by one or more processors, the data transmission processing method or the data reception processing method described in any example of the present disclosure, for example, at least one of the methods illustrated in FIGS. 2, 4 to 8.

With respect to the apparatus in the foregoing examples, the specific manner in which each module performs its operation has been described in detail in the examples of the related methods, and will not be further described in detail here.

Figure 11:
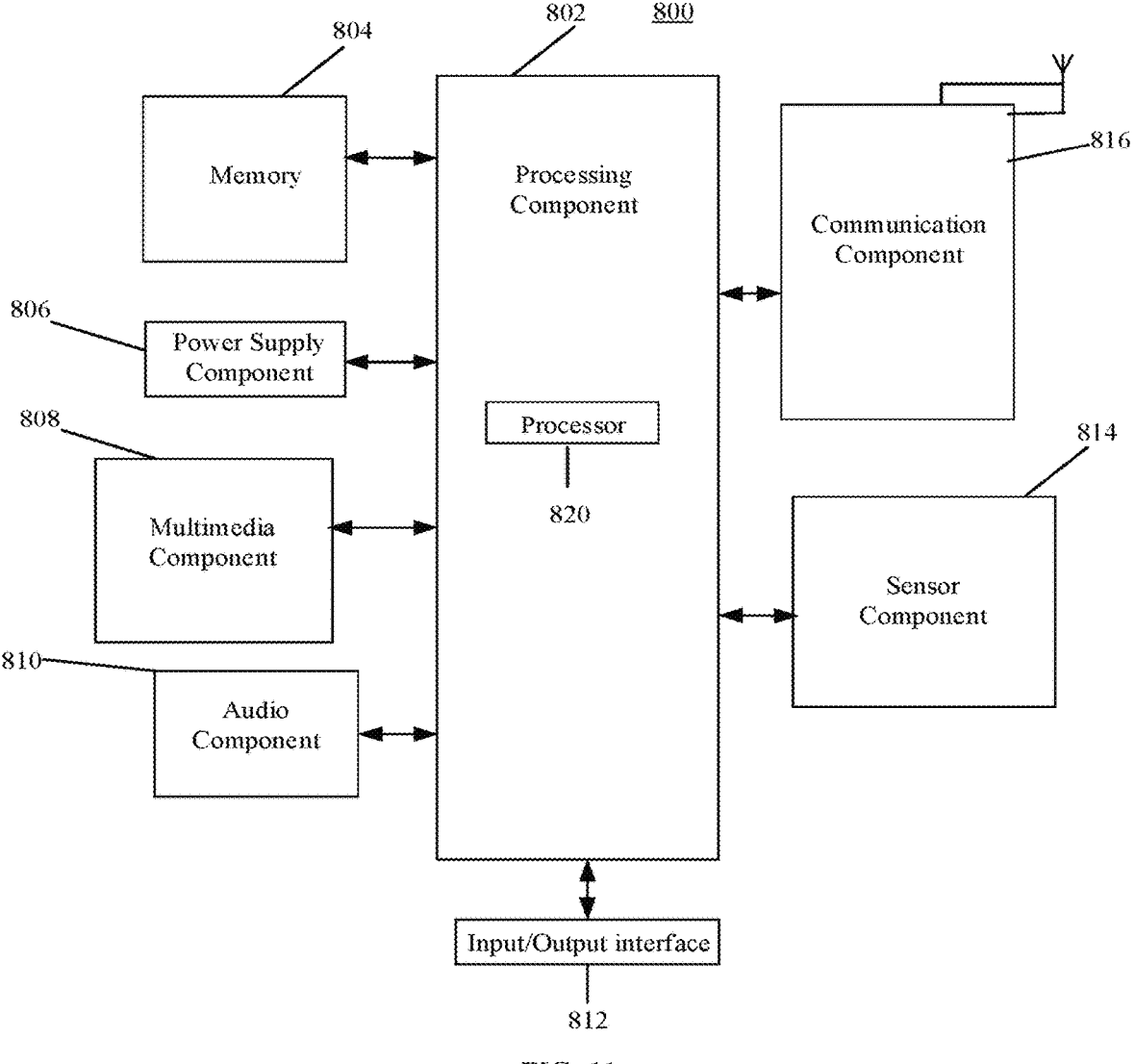
FIG. 11 illustrates a block diagram of a user equipment according to an example.

FIG. 11 illustrates a block diagram of a user equipment 800 according to an example. For example, the user equipment 800 may be a mobile phone, a computer, a digital broadcasting user device, a messaging device, a game console, a tablet device, a medical device, a fitness device, a personal digital assistant, and the like.

As illustrated in FIG. 11, the user equipment 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the user equipment 800, such as operations associated with display, phone calls, data communications, camera operations, and recording operations. The processing component 802 may include one or more processors 820 to execute instructions to complete all or a part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operations of the user equipment 800. Examples of such data include instructions for any application or method operated on the user equipment 800, contact data, phonebook data, messages, pictures, videos, and the like. The memory 804 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 806 provides power for various components of the user equipment 800. The power supply component 806 may include a power management system, one or more power supplies, and other components associated with generating, managing, and distributing power for the user equipment 800.

The multimedia component 808 includes a screen providing an output interface between the user equipment 800 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 808 includes a front camera and/or a rear camera. The front camera and/or rear camera may receive external multimedia data when the user equipment 800 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) that is configured to receive an external audio signal when the user equipment 800 is in an operating mode, such as a call mode, a recording mode, and a voice recognition mode. The received audio signal may be further stored in memory 804 or transmitted via communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include but not be limited to a home button, a volume button, a start button and a lock button.

The sensor component 814 includes one or more sensors to provide the user equipment 800 with status assessments in various aspects. For example, the sensor component 814 may detect an open/closed state of the user equipment 800 and a relative positioning of components such as the display and keypad of the user equipment 800, and the sensor component 814 may also detect a change in position of the user equipment 800 or a component of the user equipment 800, the presence or absence of a user contacting with the user equipment 800, orientation or acceleration/deceleration of the user equipment 800, and temperature change of the user equipment 800. The sensor component 814 may include a proximity sensor configured to detect the presence of a nearby object without any physical contact. The sensor component 814 may further include an optical sensor, such as a Complementary Metal-Oxide-Semiconductor (CMOS) or Charged Coupled Device (CCD) image sensor, for being applied in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the user equipment 800 and other devices. The user equipment 800 may access a wireless network based on a communication standard, such as WiFi, 2G or 3G, or a combination thereof. In one example, the communication component 816 receives broadcast signals or broadcast related information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the user equipment 800 may be implemented by one or more application specific integrated circuits (ASIC), digital signal processors (DSP), digital signal processing equipments (DSPD), programmable logic devices (PLD), field programmable gate arrays (FPGA), controllers, microcontrollers, microprocessors, or other electronics to perform the foregoing methods.

In one or more examples, there is also provided a nontransitory computer-readable storage medium including instructions, such as the memory 804 including instructions. These instructions may be executed by the one or more processors 820 of the user equipment 800 to complete the foregoing methods. For example, the non-transitory computer-readable storage medium may be a read-only memory (ROM), a random access memory (RAM), a CD-ROM, a magnetic tape, a floppy disk, an optical data storage device, and the like.

Figure 12:
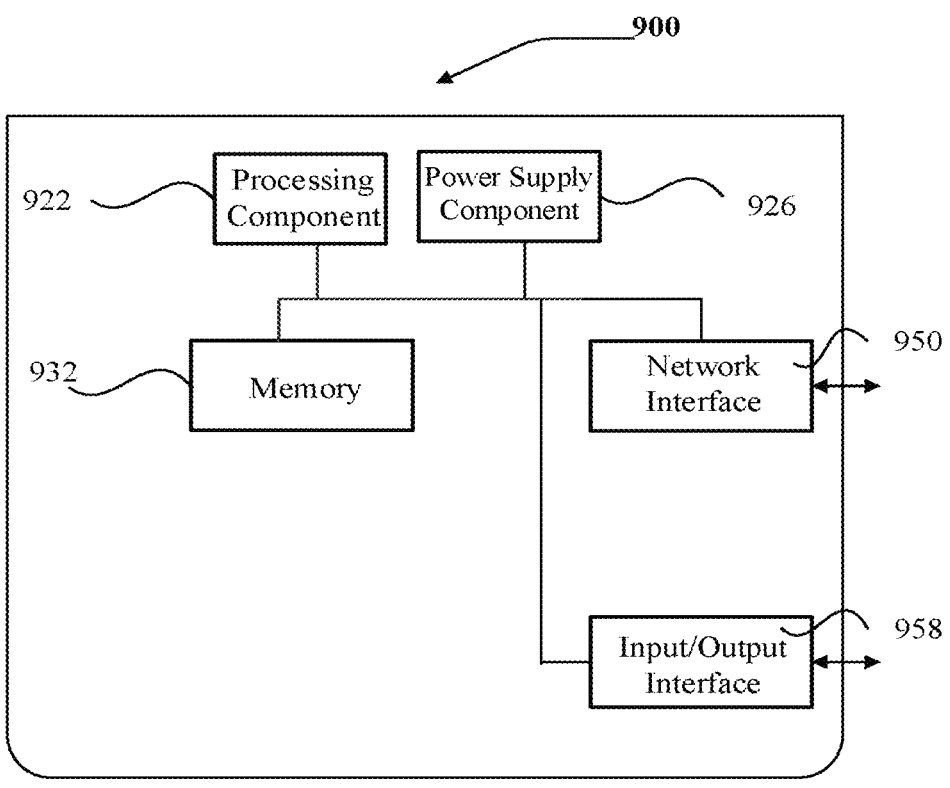
FIG. 12 illustrates a block diagram of a base station according to an example.

As illustrated in FIG. 12, an example of the present disclosure illustrates a structure of a base station. For example, the base station 900 may be provided as a network-side device. As illustrated in FIG. 12, the base station 900 includes a processing component 922 which further includes one or more processors, and a memory resource represented by a memory 932 which is used to store instructions that may be executed by the processing component 922, such as application programs. The application programs stored in the memory 932 may include one or more modules, each of which corresponds to a set of instructions. In addition, the processing component 922 is configured to execute instructions to perform any one of the aforementioned methods applicable to the base station, for example, the methods illustrated in FIG. 2 and FIG. 4.

The base station 900 may also include a power supply component 926 configured to perform power management for the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

The solutions provided by the example of the present disclosure may obtain the following beneficial effects.

According to the examples of the present disclosure, an SL control signaling that carries a wake-up signal configuration is sent from a first UE to a second UE, and the wake-up signal configuration is associated with transmitting an SL wake-up signal from the first UE to the second UE. In this way, one wake-up signal configuration is sent from the first UE to the second UE, which enables the second UE to learn whether the first UE is to transmit the SL wake-up signal, and moreover, enables the second UE to control itself in a wake-up state or in a sleep state according to a reception of the SL wake-up signal and/or the received SL wake-up signal based on the SL wake-up signal configuration, which can reduce the power consumption of the second UE by monitoring the communication on the SL in the wake-up state and stopping monitoring the SL in the sleep state.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

Obviously, numerous modifications and variations of the present invention are possible in light of the above teachings. It is therefore to be understood that within the scope of the appended claims, the invention may be practiced otherwise than as specifically described herein.

The invention claimed is:

1. A data transmission processing method, comprising:
   sending, by a first user equipment (UE), a sidelink (SL) control signaling that carries a wake-up signal configuration to a second UE, wherein the wake-up signal configuration is associated with transmitting an SL wake-up signal from the first UE to the second UE;
   wherein the wake-up signal configuration comprises a transmission configuration for indicating one or more transmission parameters based on which the first UE transmits the SL wake-up signal;
   determining, by the first UE, a priority of the SL wake-up signal transmitted to the second UE;

determining, by the first UE and based on the transmission configuration and the priority of the SL wake-up signal, to transmit the SL wake-up signal to the second UE or not to transmit the SL wake-up signal to the second UE; and
   transmitting, by the first UE, the SL wake-up signal to the second UE, which comprises: transmitting, in response to determining that there are a plurality of to-be-transmitted SL wake-up signals, the plurality of to-be-transmitted SL wake-up signals sequentially in accordance with their priorities.

2. The method according to claim 1, wherein the wake-up signal configuration further comprises:
   a processing configuration for determining whether to start an on-duration timer when the second UE does not receive the SL wake-up signal transmitted by the first UE.

3. The method according to claim 1, wherein the one or more transmission parameters comprise at least one of:
   transmission time information for indicating transmission starting time of the SL wake-up signal, wherein the transmission starting time is before starting time of a discontinuous reception (DRX) cycle;
   or
   a type configuration for indicating a type of the SL wake-up signal, wherein the types of the SL wake-up signal comprise at least one of: a first type of SL wake-up signal that triggers an on-duration timer to be started or a second type of SL wake-up signal that does not trigger the on-duration timer to be started.

4. The method according to claim 3, wherein the transmission time information comprises: a transmission time offset for indicating a time offset of the transmission starting time of the SL wake-up signal with respect to the starting time of the DRX cycle.

5. The method according to claim 3, further comprising:
   transmitting, by the first UE, in response to being unable to transmit all to-be-transmitted SL data to the second UE in a current DRX cycle, the first type of SL wake-up signal to the second UE at the transmission starting time; or
   transmitting, by the first UE, in response to predicting that no to-be-transmitted SL data occurs for the second UE in a next DRX cycle, the second type of SL wake-up signal to the second UE at the transmission starting time.

6. The method according to claim 1, wherein determining, by the first UE, the priority of the SL wake-up signal transmitted to the second UE comprises at least one of:
   determining, based on a highest priority of logical channels that are associated with the second UE and have a data transmission, the priority of the SL wake-up signal;
   determining, based on a lowest priority of all logical channels that are associated with the second UE, the priority of the SL wake-up signal;
   configuring a corresponding priority of the SL wake-up signal for each second UE;
   obtaining the priority of the SL wake-up signal configured by a network for each second UE; or
   determining, based on a communication protocol, the priority of the SL wake-up signal.

7. The method according to claim 1, wherein determining to transmit the SL wake-up signal to the second UE or not to transmit the SL wake-up signal to the second UE is further based on a priority of a Uu signal that has a resource conflict with the SL wake-up signal.

8. The method according to claim 7, wherein determining to transmit the SL wake-up signal to the second UE comprises:

transmitting, in response to determining that the priority of the SL wake-up signal is higher than a priority threshold of the SL wake-up signal and the priority of the Uu signal is lower than a priority threshold of the Uu signal, the SL wake-up signal to the second UE; and wherein determining not to transmit the SL wake-up signal to the second UE comprises:

transmitting, in response to determining that the priority of the SL wake-up signal is lower than or equal to a priority threshold of the SL wake-up signal, the Uu signal rather than the SL wake-up signal to the second UE;

transmitting, in response to determining that the priority of the Uu signal is higher than or equal to a priority threshold of the Uu signal, the Uu signal rather than the SL wake-up signal to the second UE; and transmitting, in response to determining that the priority of the SL wake-up signal is lower than or equal to the priority threshold of the SL wake-up signal and the priority of the Uu signal is higher than or equal to the priority threshold of the Uu signal, the Uu signal rather than the SL wake-up signal to the second UE.

9. The method according to claim 1, wherein the priority of the first type of SL wake-up signal and the priority of the second type of SL wake-up signal are determined in different ways.

10. The method according to claim 1, comprising:

receiving, by the second UE, the SL control signaling that carries the wake-up signal configuration from the first UE; and monitoring, by the second UE and based on the wake-up signal configuration, the SL wake-up signal from the first UE.

11. The method according to claim 10, wherein the wake-up signal configuration further comprises:

a processing configuration for determining whether to start an on-duration timer when the second UE does not receive the SL wake-up signal transmitted by the first UE.

12. The method according to claim 10, wherein the one or more transmission parameters comprise at least one of:

transmission time information for indicating transmission starting time of the SL wake-up signal, wherein the transmission starting time is before starting time of a discontinuous reception (DRX) cycle;

or a type configuration for indicating a type of the SL wake-up signal, wherein the types of the SL wake-up signal comprise at least one of: a first type of SL wake-up signal that triggers an on-duration timer to be started or a second type of SL wake-up signal that does not trigger the on-duration timer to be started.

13. The method according to claim 12, wherein the transmission time information comprises: a transmission time offset for indicating a time offset of the transmission starting time of the SL wake-up signal with respect to the starting time of the DRX cycle.

14. The method according to claim 10, further comprising:

determining, by the second UE and based on the type of the SL wake-up signal received, to or not to trigger the on-duration timer.

15. A user equipment (UE), comprising:

one or more processors; and a memory for storing instructions executable by the one or more processors;

wherein the one or more processors are configured to implement:

sending a sidelink (SL) control signaling that carries a wake-up signal configuration to a second UE, wherein the wake-up signal configuration is associated with transmitting an SL wake-up signal from the UE to the second UE;

wherein the wake-up signal configuration comprises a transmission configuration for indicating one or more transmission parameters based on which the UE transmits the SL wake-up signal;

determining a priority of the SL wake-up signal transmitted to the second UE;

determining, based on the transmission configuration and the priority of the SL wake-up signal, to transmit the SL wake-up signal to the second UE or not to transmit the SL wake-up signal to the second UE; and transmitting, the SL wake-up signal to the second UE, which comprises: transmitting, in response to determining that there are a plurality of to-be-transmitted SL wake-up signals, the plurality of to-be-transmitted SL wake-up signals sequentially in accordance with their priorities.

\*   \*   \*   \*   \*